United States Patent
Williams

(10) Patent No.: US 7,415,367 B2
(45) Date of Patent: Aug. 19, 2008

(54) SYSTEM AND METHOD TO LOCATE COMMON PATH DISTORTION ON CABLE SYSTEMS

(75) Inventor: Thomas Holtzman Williams, Longmont, CO (US)

(73) Assignee: Arcom Digital, LLC, Syracuse, NY (US)

( * ) Notice: Subject to any disclaimer, the term of this patent is extended or adjusted under 35 U.S.C. 154(b) by 0 days.

(21) Appl. No.: 10/850,528

(22) Filed: May 20, 2004

(65) Prior Publication Data

US 2004/0245995 A1  Dec. 9, 2004

Related U.S. Application Data

(60) Provisional application No. 60/472,379, filed on May 20, 2003.

(51) Int. Cl.
G01R 31/00 (2006.01)

(52) U.S. Cl. ............... 702/59; 725/107; 348/192

(58) Field of Classification Search ............ 702/57–59, 702/62, 64–66, 69, 74–76, 79, 94, 111, 117, 702/125, 149, 159, 176, 185; 455/67.13, 455/67.14; 324/76.22, 76.23, 76.24, 67.13, 324/67.14; 348/192; 725/107
See application file for complete search history.

(56) References Cited

U.S. PATENT DOCUMENTS

| | | | |
|---|---|---|---|
| 3,774,201 A * | 11/1973 | Collins | 324/76.24 |
| 5,073,822 A | 12/1991 | Gumm et al. | |
| 5,461,318 A | 10/1995 | Borchert et al. | |
| 5,617,137 A | 4/1997 | Whitlow | |
| 5,682,100 A | 10/1997 | Rossi et al. | |
| 5,990,687 A | 11/1999 | Williams | |
| 6,140,822 A | 10/2000 | Williams | |
| 6,151,559 A | 11/2000 | Williams | |
| 6,344,749 B1 | 2/2002 | Williams | |

(Continued)

FOREIGN PATENT DOCUMENTS

EP   0487306 A2   5/1992

(Continued)

OTHER PUBLICATIONS

Williams, Thomas H., et al., Results of Return Plant Testing, Symposium, Jun. 1997, pp. 142-165, 1997 NCTA Technical Papers.

(Continued)

*Primary Examiner*—Edward Raymond
*Assistant Examiner*—Mohamed Charioui
(74) *Attorney, Agent, or Firm*—Lawrence P. Trapani

(57) ABSTRACT

A system and method to range a distance to a source of CPD (Common Path Distortion) on a two-way cable system, comprising a local CPD source and a cross-correlator. The local CPD source generates a local distortion signal from a downstream signal, wherein the downstream signal includes multiple carriers of TV channels. The source of CPD in the cable system mixes the carriers of the TV channels to create an upstream actual distortion signal. The cross-correlator performs a cross-correlation between the local distortion signal and the upstream actual distortion signal to create a cross-correlation plot, and the distance to the source of CPD is determined from the round-trip time.

67 Claims, 8 Drawing Sheets

U.S. PATENT DOCUMENTS

| | | | |
|---|---|---|---|
| 6,356,555 B1* | 3/2002 | Rakib et al. | 370/441 |
| 6,417,942 B1* | 7/2002 | Seto et al. | 398/5 |
| 6,425,132 B1 | 7/2002 | Chappell | |
| 6,570,394 B1 | 5/2003 | Williams | |
| 6,687,632 B1* | 2/2004 | Rittman | 702/79 |
| 7,069,163 B2 | 6/2006 | Gunther et al. | |
| 2001/0051504 A1* | 12/2001 | Kubo et al. | 455/63 |
| 2002/0086641 A1* | 7/2002 | Howard | 455/67.1 |
| 2002/0161542 A1* | 10/2002 | Jones et al. | 702/108 |
| 2004/0039976 A1 | 2/2004 | Gunther et al. | |
| 2004/0073937 A1 | 4/2004 | Williams | |
| 2004/0091055 A1 | 5/2004 | Williams | |
| 2006/0012376 A1 | 1/2006 | Furse et al. | |

FOREIGN PATENT DOCUMENTS

| | | |
|---|---|---|
| EP | 0487306 A3 | 5/1992 |
| JP | 60176336 | 9/1985 |
| SU | 1132265 | 12/1984 |
| WO | WO 97/20196 | 6/1997 |
| WO | PCT/AU00/00235 | 9/2000 |
| WO | WO 00/57571 | 9/2000 |
| WO | WO 2004/070398 A2 | 8/2004 |
| WO | WO 2004/070398 A3 | 8/2004 |

OTHER PUBLICATIONS

Williams, Thomas Holtzman, Cable Scope® Instruction Manual, 1998-2003, pp. 1-10, 13-15, 20-22, 24-30, Holtzman Inc., Longmont, Co.

Williams, Thomas Holtzman, Return Path Linear Distortion and Its Effect on Data Transmissions, Symposium, Jun. 2000, pp. 54-71, 2000 NCTA Technical Papers.

Williams, Thomas Holtzman, Proofing and Maintaining Upstream Cable Plant With Digital Signal Analysis Techniques, 49th ARFTG Conference Digest, Jun. 13, 1997, pp. 7-18.

Patel, Bharat, Common Path Distortions Explained, article, Oct. 13, 1998, pp. 1-2, 5-9, 16-18, 22-23, 27-28, SCTE, http://chapters.scte.org/newengland/reference/CPD/CPD2.HTM.

Lee, Edward A. & Messerschmitt, David G., Digital Communication, Second Edition, reference book, 1994, pp. 231-234, Kluwer Academic Publishers, Norwell, MA.

Zhang, Yun Hong & Jennings, Len, DSP Applictions in Range Finding, article, Jan. 1, 2002, pp. 61-66, New Zeland, http://www.manukau.ac.nz/departments/e_e/research/2002/yz.pdf.

CPD Fault Locator, by Rod Eastment et al Source: www/scte.org.

Int'l Search Report, Oct. 2, 2006, PCT/US2006/006360, pp. 2-3, 5-6.

Written Opinion w/Claims, Oct. 2, 2006, PCT/US2006/006360, pp. 10-21.

\* cited by examiner

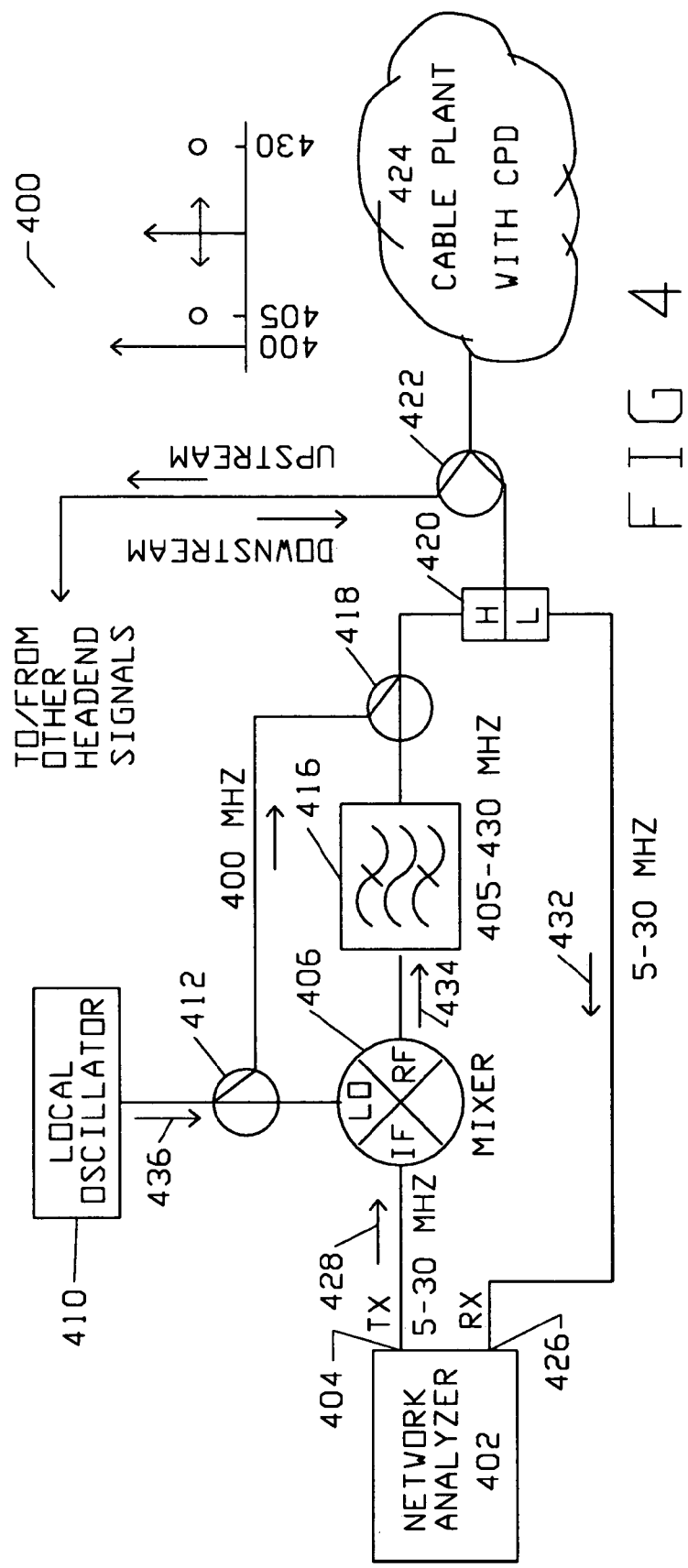

SYSTEM AND METHOD TO LOCATE COMMON PATH DISTORTION ON CABLE SYSTEMS

BACKGROUND—FIELD OF THE INVENTION

This application is a continuation of U.S. provisional application No. 60/472,379 filed on May 20, 2003 titled System and Method to Locate Common Path Distortion of Cable Systems.

BACKGROUND—DESCRIPTION OF PRIOR ART

Two-way hybrid fiber coax (HFC) cable systems typically provide two-way communications for end users (typically homes or businesses) using both coaxial cable and fiber optic cable. A headend is a collection point for downstream signals and a termination point for upstream signals. "Downstream" or "forward" means signals traveling away from the headend and "upstream" or "reverse" means signals traveling toward the headend. The coaxial portion of cable networks uses a tree-and-branch architecture to split downstream signals and combine upstream signals. On the coaxial portion of the cable plant, downstream signals are sent from a headend to an end user in a downstream frequency band, which may be 54 to 860 MHz. The composite downstream signal is typically comprised of analog television signals in the lower frequencies, such as 54 to 550 MHz, and digital television signals and cable modem traffic in the upper frequency band, such as 550 to 860 MHz. Upstream signals travel from the end users to the headend in the 5 to 42 MHz upstream frequency band over the same coaxial cable that is used for downstream communications. The fiber portion of the plant is typically nearer to the headend and transports signals a long distance to a cluster of subscribers. The point at which the downstream fiber optic (light) signals are converted to downstream electrical signals for transmission over coaxial cable is called a fiber node. The upstream electrical signals are also converted into fiber optic signals at the fiber node for transmission back to the headend. In larger plants there may be additional signal distribution/collection points called "hubs". In the United States the downstream is typically divided into 6 MHz channels that usually contain analog NTSC carriers or digital carriers. Normally, upstream channel spacing is not uniform.

Common path distortion (CPD) is an upstream impairment that is created on the coaxial portion of HFC cable systems. CPD is caused by downstream signals mixing together in non-linear elements to create an upstream interference that is comprised of distortion or inter-modulation products. CPD is typically produced by diodes that are formed by metallic corrosion in network elements such as taps, amplifiers, splitters, power inserters, and connectors. Finding the network element where the distortion is created is a difficult problem for cable technicians, because the act of touching or opening a network element frequently corrects the CPD problem, albeit temporarily.

With a large number of analog television channels (such as NTSC) on the downstream path, the upstream spectral plot caused by CPD has an appearance on a spectrum analyzer of three beats every 6 MHz across the return band. In the United States, with a standard frequency plan, second order distortion beats are centered every integer multiple of 6 MHz, and third order distortion beats are located every 1.25 MHz above and below the second order beats. If there are two radio frequency carriers at fa and fb, second order beats can be created by mixing products such as 2*fa, or 2*fb, or fa−fb, or fb−fa. If you have three carriers, such as fa, fb, and fc, third order beats can be created from many mixing products such as 3*fa, 3*fb, 3*fc, fa+fb+bf, 2fa−fb, 2fb−fc, 2fc−fa, etc. The distortion products at the 6 MHz increments are second order distortion products because television channel spacing in the United States is 6 MHz. The third order distortion products at plus and minus 1.25 MHz from the second order beats are offset because video carrier frequencies, such as channel 2 at 55.25 MHz and channel 3 at 61.25 MHz, are not integer multiples of 6 MHz in a standard frequency plan.

While CPD has been observed on the upstream cable plant, mixing from CPD products also fall into the downstream frequency spectrum, where a visual impairment will be created that is similar to CSO (common second order) or CTB (composite triple beat), which are well-known downstream impairments. Thus, customer complaints about excessive downstream CTB may, in fact, be partially downstream CPD distortion products. Thus there is a need to find and fix sources of CPD.

The prior art method of finding CPD is to disconnect upstream network elements one at a time until the CPD goes away. This is a trial and error process, which is slow and prone to error because of the aforementioned problem of temporarily fixing CPD when the defective element is disturbed. Disconnecting network elements also disrupts services.

A new method in use by Optus in Australia ranges a distance to a CPD source using custom-designed special-purpose test equipment. This method is described by Australian patent application TW474071. Their system is comprised of PC-based test equipment, which injects test signals into vacant bandwidth on the downstream plant. On many cable systems vacant bandwidth for testing does not exist.

Interference with cable entertainment signals, voice carriers and data traffic for test is generally unacceptable.

This invention discloses a better method by determining a time delay associated with a defective CPD-creating element by using signals that are already being transported on the cable system. The time delay may be used to compute a round-trip distance using the known velocity of propagation. Knowing a distance to the CPD-creating element allows the defective device to be identified from a network map that shows distances.

This invention also discloses an improved injected test signal method that uses standard off-the-shelf test equipment.

SUMMARY OF THE INVENTION

This invention is a system to range a distance to a source of CPD on a two-way cable system utilizing signals that are normally carried on the downstream signal path. The system is comprised of a local CPD source that generates a local distortion signal from a downstream signal, and a source of CPD that mixes the downstream signal to create an upstream actual distortion signal. A cross-correlator performs a cross-correlation between the local distortion signal and the upstream actual distortion signal to create a cross-correlation plot. A round-trip time to the source of CPD is determined from the cross-correlation plot, and the distance is determined from the round-trip time.

DESCRIPTION OF THE DRAWINGS

FIG. 4 is a test equipment block diagram of the present invention using empty spectrum on the cable plant and a conventional off-the-shelf network analyzer.

DESCRIPTION FIG. 1

Figure 1:
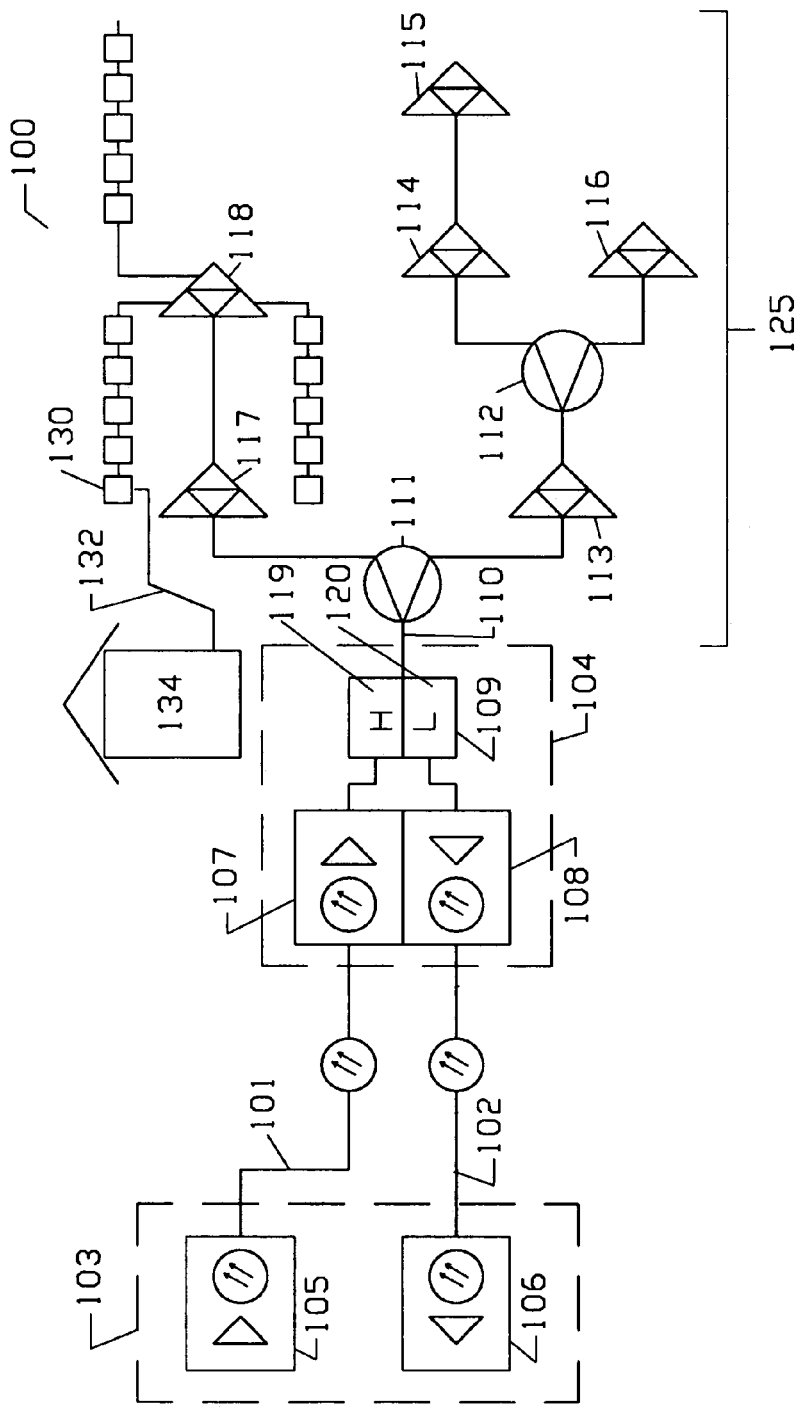
FIG. 1 is a prior art block diagram of a hybrid fiber-coax (HFC) cable plant

FIG. 1 is a prior-art block diagram that illustrates a bi-directional cable system 100 which employs a single mode fiber optic cable 101 for the long reach from a headed 103 to a fiber node 104. In the headend 103, which is the collection point for downstream signals, are located a downstream laser transmitter 105 and an upstream laser receiver 106. At the fiber node 104, which is typically housed in a weather tight outdoor housing, a downstream signal is converted from an optical signal into an electrical signal by a downstream laser receiver 107 and an upstream electrical signal is converted into an optical signal by an upstream laser transmitter 108. The upstream and downstream electrical signals are applied to a diplex filter 109, which allows bi-directional signal flow on a same hard line coaxial cable 110. Diplex filters consist of a high-pass section 119 and a low-pass section 120. Splitter/combiners 111 and 112 split the downstream signals and combine the upstream signals. Two-way amplifiers 113-118 boost the signal levels in both directions to overcome the loss of the coaxial cables and splitter/combiners. Taps, such as a tap 130, are also splitting/combining devices that allow signal extraction and insertion. A coaxial cable plant 125 can be defined as the coaxial portion of the bi-directional cable system 100, which extends from the fiber node 104 to the insides of the houses such as a house 134. Typically, the coaxial cable plant 125 is constructed of solid sheath hard-line aluminum coaxial cable from the fiber node 104 to the tap 130, and a braided shield drop cable 132 is used from the tap 130 to a house 134 as well as inside the house 134. All coaxial cable has a single center conductor, which is typically surrounded by a foam dielectric. Hard line coaxial cable has a single shield, and flexible drop coaxial cable normally has multiple shields that are electrically in contact with each other.

DESCRIPTION FIG. 2

Figure 2:
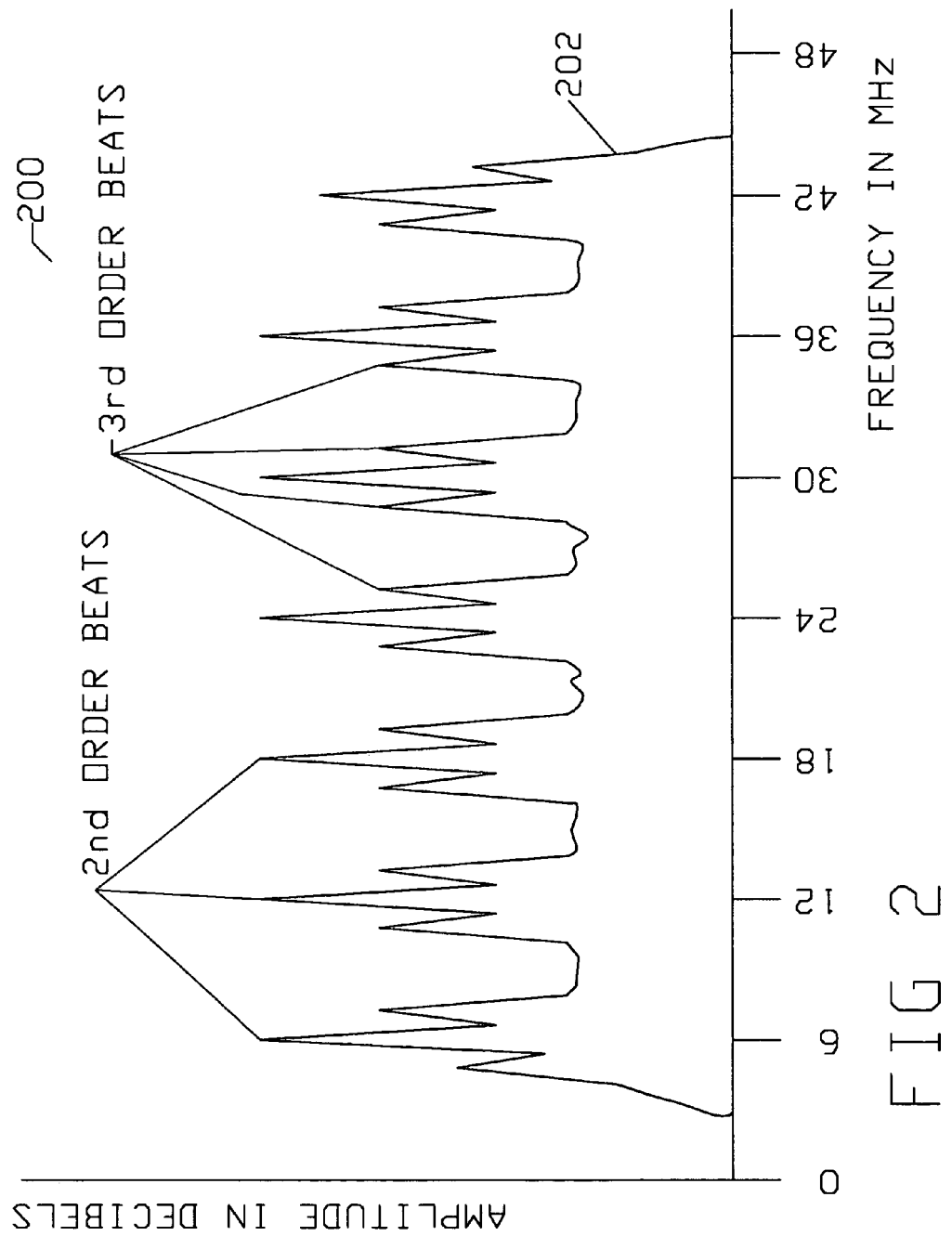
FIG. 2 is a spectral plot of an upstream spectrum with CPD.

FIG. 2 is a spectral plot 200 showing CPD distortion that was created on the cable portion of a HFC plant using a standard frequency plan. The upstream frequency span is 5 to 42 MHz. The plot is an example of an actual distortion signal 202 that is created by one or more elements that are sources of CPD in the cable plant. If the downstream signal contains both digital and analog carriers, the actual distortion signal 202 will contain mixing components of analog channels with other analog channels, digital channels with other digital channels, and analog channels mixing with digital channels. Second other distortion components from analog TV channels are shown every 6 MHz and third order distortion components from analog TV channels occur plus and minus 1.25 MHz from the second order beats. The CPD-produced actual distortion signal 202 will be summed with legitimate signals, undesired random noise products, or undesired ingressing signals. Different frequency spacing or the use of harmonically related carriers will change the appearance of the CPD spectrum. Having a greater percentage of digital carriers relative to analog carriers will also change the spectral appearance of the actual distortion signal 202. As the percentage of downstream digital carriers increases in the future, the actual distortion signal 202 will appear more like random noise and the spectral peaks will be less prominent.

DESCRIPTION FIG. 3

Figure 3:
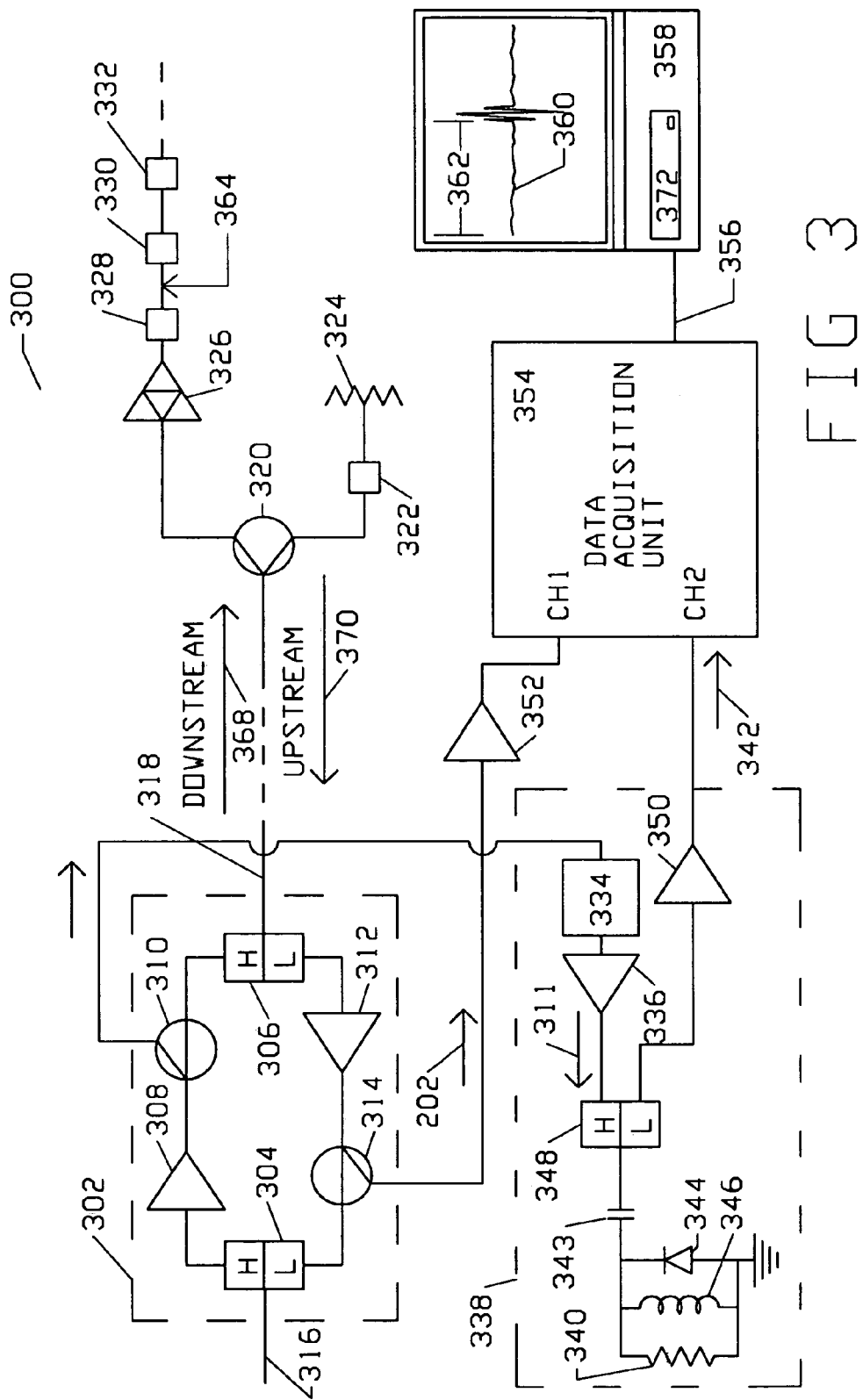
FIG. 3 is test equipment block diagram of the present invention using existing signals that are already being transported over the cable plant

FIG. 3 is a block diagram 300 of test equipment that may be used to find a location of a source of CPD 324. The coaxial cable plant in this block diagram is one of many possible examples, but it exhibits a common equipment configuration illustrating amplifiers, a splitter, taps, terminators, and coaxial line. The block diagram 300 is meant as an example, and it is not intended to limit the scope of the invention. Testing may be performed at the headend or hub site, or out in the field. As illustrated in FIG. 3, testing is performed at a two-way amplifier housing 302. The two-way amplifier housing 302 connects to an input cable line 316, which connects to a hub or a headend through a fiber optic cable, and an output cable line 318, which connects to subscribers. The amplifier may be a device that is in a cascade of amplifiers, part of a fiber node, or located in the headend. A downstream signal 368, which may be 54-860 MHz, propagates from left to right on the diagram 300. An upstream signal 370, which may be 5-42 MHz, propagates from the right to the left on the diagram 300. Inside the amplifier housing 302, a subset of the components of a typical two-way amplifier is illustrated. The downstream signal 368 passes through a high (H) port of a diplex filter 304, a forward amplifier 308, a forward test point directional coupler 310, and a high port of a diplex filter 306. The upstream signal 370 passes through a low (L) port of the diplex filter 306, a return amplifier 312, an upstream test point directional coupler 314, and a low port of the diplex filter 304. As an example, CPD may be formed when the downstream signal 368, which may be comprised of analog TV channels, digital TV channels, cable modem signal, or other signals, passes through the amplifier housing 302, the output cable line 318, a splitter 320, a tap 322 and reaches a source of CPD 324. In this example, the source of CPD 324 is a defective end of line terminator. The source of CPD 324 may, for example have an internal diode formed by a bad ground connection. The internal corrosion-created diode mixes the downstream signal 368, creating the actual distortion signal 202 comprised of mixed products of the individual downstream carriers, which may be both analog and digital carriers. The actual distortion signal 202, which appears in the spectral plot of FIG. 2, propagates upstream, where it interferes with legitimate upstream signals.

Other network elements, including a two-way amplifier 326 and taps 328, 330, and 332, are without defect and do not create an upstream CPD distortion signal from the downstream signal components.

The downstream signal 368 is sampled through a coupled port of the forward test point directional coupler 310, through a band pass filter/tilt network 334 and through an amplifier 336, to create a filtered downstream signal 311. The filtered downstream signal 311 is connected to a local CPD source 338. The band pass filter/tilt network 334 preferably passes only the digital signals, which are more noise-like and random, and thus better suited for use as test signals than the analog television carriers. The analog television carriers have strong periodic horizontal sync energy. In the local CPD source 338, a non-linear element, such as a Schottky diode 344, mixes the filtered downstream signal 368 to make a local distortion signal 342. The local distortion signal 342 is correlated to the energy in the actual distortion signal 202 that is created by digital carriers in the source of CPD 324. A high port of a diplex filter 348 is connected to the amplifier 336. A common port of the diplex filter 348 is connected to the diode 344 through a bypass capacitor 343. An inductor 346 holds the diode 344 at 0 volts DC so a clipping point will be repeatable. A resistor 340 provides an improved match for the diplex filter 348. A low port of diplex filter 348 removes the distortion products above 42 MHz. An amplifier 350 boosts the level of the local distortion signal 342 before it is captured on a digital data acquisition unit 354.

A sample of the actual distortion signal 202 is captured from the coupled port of the upstream test point directional coupler 314 and is amplified by an amplifier 352. The digital data acquisition unit 354 simultaneously captures an amplified sample of the actual distortion signal 202 on channel 1 and the local distortion signal 342 on channel 2. Both traces are downloaded over a cable 356 to a personal computer (PC) 358 where they are processed together to find a time delay between the actual distortion signal 202 and the local distortion signal 342. The PC 358, running software, acts as a cross-correlator 372. The cable 356 may be a general-purpose interface bus (GPIB), serial, parallel, or universal serial bus (USB) depending on the interface method provided by the data acquisition unit 354. The round-trip time delay to and from the source of CPD 324 can be established as the time of an energy peak in a cross-correlation plot 360. The cross-correlation plot 360 on the PC shows a time difference 362 required for downstream energy to travel to the source of CPD 324 and to come back to amplifier housing 302. The distance to the source of CPD 324 can be calculated from the round-trip time for a signal to travel to the source of CPD 324 and return, taking into account the velocity of propagation of the cable. This distance calculation from time delay, which is also used in radar and time domain reflectometers, is well known in the art.

The band pass filter/tilt network 334 may be used for cross-correlation signal improvement. Digital traffic is better suited for cross-correlation measurements than analog signals, which are not as random. It is advantageous to include as many digital channels as are available. Since tilt of the downstream signal at the CPD source will not be known in advance, the tilt may optionally be adjusted to produce the strongest cross-correlation peak with the lowest uncorrelated noise. The gain of the amplifier 336 may also be adjustable to improve the quality of the cross-correlation signal. Likewise, it may be desirable to reverse the polarity of the diode 344, since a polarity of the CPD-creating junction diode is not known in advance. That is, either an anode or a cathode may be connected to ground.

The digital acquisition unit captures signals by performing an A-D (analog-to-digital) conversion and storing the signals in memory for subsequent downloading. Both signals may be considered to be arrays of numbers. The processing between the captured local distortion signal 342 and the captured actual distortion signal 202 can be done with a cross-correlation process, which is well known in the art. A software package called Matlab®, which is available from Math Works® can perform the cross-correlation function. "C Language Algorithms for Digital Signal Processing" by Embree and Kimble is a source for code that can perform the cross-correlation function. It is an advantage to cross-correlate two large arrays of samples, since it will produce the lowest background noise relative to a cross-correlation peak. The array size may vary from a few hundred to several thousand samples. A sampling rate of 100 Megasamples per second or greater is recommended for the digital acquisition unit 354, which may be a digital oscilloscope, a data acquisition card for a PC, or a module from suppliers such as Link Instruments, Pico, or National Instruments. Triggering of the digital acquisition unit 354 may be random or tied to an event such as video horizontal sync or the power line frequency.

This testing method has the advantage over prior art systems of using downstream signals, which are already on the downstream plant, as test signals. On many cable systems vacant bandwidth for testing simply does not exist.

Note that the cross-correlation in the time domain function can also be accomplished by signal processing in the frequency domain by a multiplication operation, as is well known in the art. Depending on the skill of the technician, it may be an advantage to write a computer program which performs the downloading of data from the data acquisition unit 354 and the cross-correlation automatically, as well as automatically making adjustments to the gain of the amplifier 336 and the tilt of the band pass filter/tilt network 334. Averaging can be used to reduce the effects of noise or interfering signals in the cross-correlation plot 360.

Note that the diode 344 will produce second, third, fourth and higher orders of distortion. Other devices, such as field effect transistors will produce large amounts of second order distortion. If two identical diodes are connected in parallel anode-to-cathode the even order distortion products can be cancelled. Thus, the local CPD source 338 may be modified to enhance a desired order of mixing.

To summarize, the local CPD source 338 is connected to the sample of the downstream signal 368, and used to create the local distortion signal 342. The local distortion signal 342 is stored on one channel of the digital acquisition unit 354. At the same time, a sample of the actual distortion signal 202 from the defective CPD-producing element is captured on another channel of the digital acquisition unit 354. The two traces are processed by a cross-correlator 372. The peak on the cross-correlation plot 360 shows the number of microseconds of delay between the actual distortion signal 202 and local distortion signal 342. The delay can be used to range the distance between the amplifier housing 302 and the source of CPD 324. Multiple sources of CPD can be identified by this test method.

The test can be performed at any point in the network, such as a hub site, a headend, or a node, a main branch (trunk line), a secondary branch (feeder line), a tap location, or even the side of a house, if the house is the source of CPD. Likewise, any defective component creating an actual distortion signal 202 can be ranged and identified by this method.

Since distortion creation problems do not typically occur in the middle of cable spans, the time delay can be used to find the most probable defective component. For example, a location 364 in the plant has the same time delay as the source of CPD 324, but is probably not a CPD source because it is in the middle of a cable span.

DESCRIPTION FIG. 3A

The embodiment of FIG. 3 utilizes the amplifier housing 302 that provides a sampling of both upstream and downstream signals. It is also possible to obtain the sampling of both upstream and downstream signals from any point on the coaxial line by using a high-impedance probe that touches the center conductor of the coaxial cable. This probe may for example, be designed to touch the seizure screws that clamp the coaxial cable.

Figure 3A:
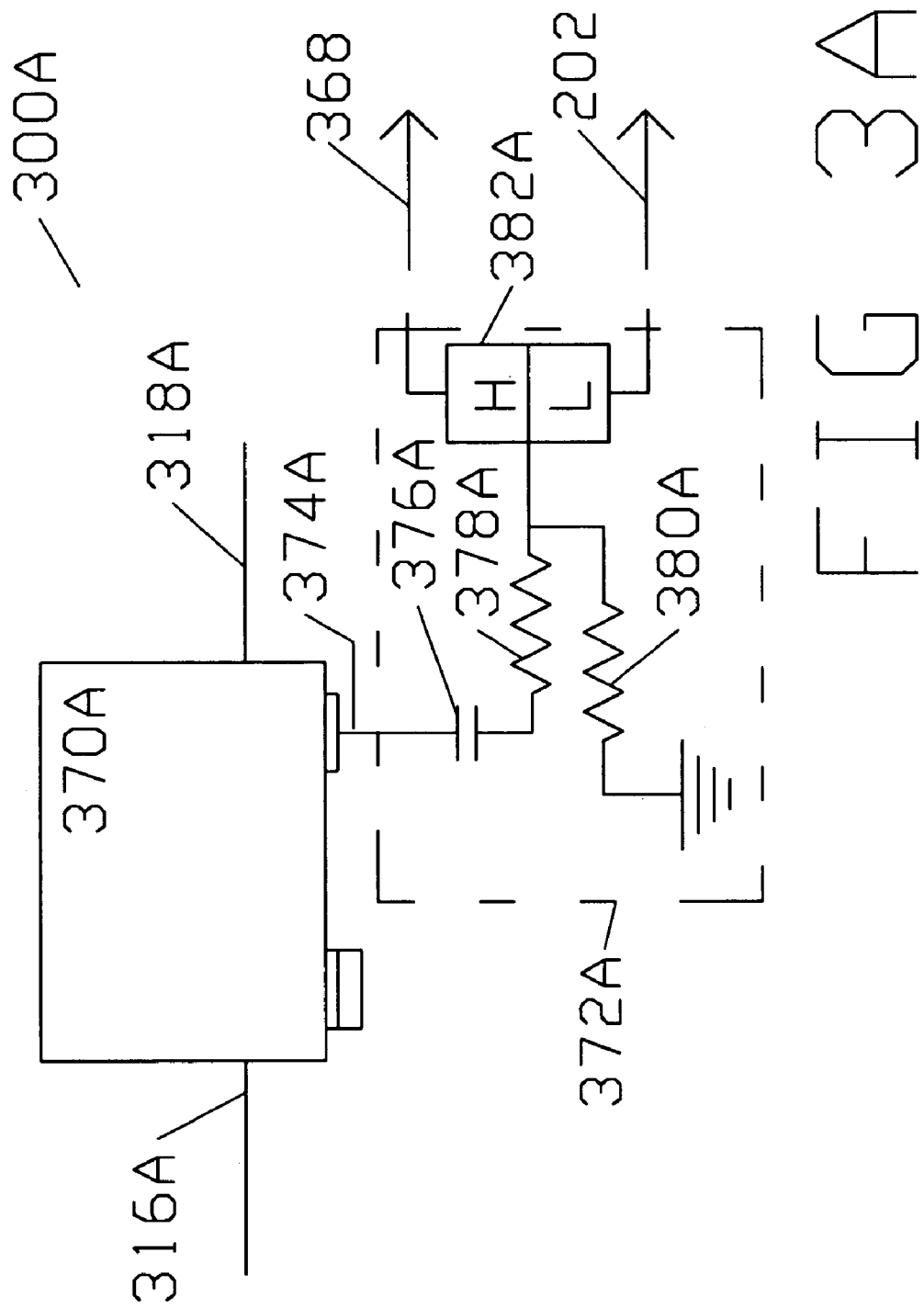
FIG. 3A is a block diagram that shows an alternate method to obtain upstream and downstream signals by probing a coaxial cable.

FIG. 3A is a block diagram 300A of a method to replace the amplifier housing 302 portion of FIG. 3. An equivalent input cable line 316A enters a housing 370A and an equivalent output cable line 318A exits the housing 370A. The housing may contain an amplifier, a tap, a directional coupler, a power inserter or other network elements. The housing 370A has a seizure screw port 374A with a plug cover that can be removed. A probe 372A can be inserted to obtain an equivalent sample of the downstream signal 368 and an equivalent sample of the actual distortion signal 202. A first lead of a blocking capacitor 376A is connected to the seizure screw and a second lead of the blocking capacitor 376A is connected to a first lead of a high-impedance resistor 378A. The second lead of the high-impedance resistor 378A, which may have a value of 2200 ohms, is connected to a first lead of an impedance-matching resistor 380A. The second lead of impedance matching resistor 380A, which may have a value of 82 ohms, is connected to ground. The junction of the second lead of the high-impedance resistor 378A and the first lead of an impedance-matching resistor 380A is connected to a common port of a diplex filter 382A. A high port of the diplex filter produces a sample of the downstream signal 368 and a low port of the diplex filter 382A produces a sample of the actual distortion signal 202. The high-impedance resistor 378A minimizes the impedance miss-match on the coaxial cable. The impedance-matching resistor 380A provides an impedance match for the diplex filter 382A. The blocking capacitor 376A prevents power-line AC voltage from destroying the resistors.

While being much simpler than the embodiment of FIG. 3, the embodiment of FIG. 3A has a disadvantage of not having directional couplers for sampling. Therefore, any echoes (reflections that are delayed signals) will produce false indications of CPD sources. However, the simplification and ease-of-use of the probe 372A are advantages.

DESCRIPTION FIG. 4

While some cable systems do not have any available vacant bandwidth for testing, other cable systems do. Another method to find the distance to a CPD source is to use a downstream frequency band and an equal bandwidth of upstream spectrum. The downstream frequency band should ideally be vacant to avoid interference with cable signals, but this method works even if the frequency band is occupied. This improved method uses an off-the-shelf network analyzer instead of custom-build hardware and software used by prior art methods.

Two signals can be put on the downstream signal path, one a fixed CW signal 436 and the other an up-converted swept signal 434. A mixing action of the fixed CW signal 436 with a swept signal 428 converts the swept signal 428 into the up-converted swept signal 434 in the downstream frequency band. The source of CPD mixes the up-converted swept signal 434 with the fixed CW signal 436 to create an upstream swept signal 432. The use of a conventional off-the-shelf network analyzer gives a complex frequency response associated with the returned upstream signal. The complex frequency response can be converted into the time domain via an inverse fast Fourier transform (IFFT). The IFFT option for the network analyzer is also called a "time domain option". The temporal plot of the IFFT shows a round-trip delay time to the source of the CPD. Some network analyzers, such as an Agilent® 8753 can be purchased with the optional IFFT function. For network analyzers that do not have an IFFT option, it is possible to import the complex frequency response data into a computer and perform the IFFT with PC software. "C Language Algorithms for Digital Signal Processing" by Embree and Kimble is also a source for code that can perform the IFFT transform.

FIG. 4 is a block diagram 400 of a cable plant utilizing the up-converted swept signal 434. As an example, a network analyzer 402 is set to sweep between 5 and 30 MHz. It has been calibrated for transmission S-parameters over the 5 to 30 MHz frequency band. A RF (radio frequency) transmit output port 404 generates the swept signal 428. The RF transmit output port 404 is connected to an IF (intermediate frequency) port of a mixer 406 which may be a double balanced mixer. The mixer 406 is driven on a LO (local oscillator) port from a local oscillator 410 through a directional coupler 412. The local oscillator 410 can be running at a high frequency, such as 400 MHz. The swept signal 428 is up-converted from 5-30 MHz to 405-430 MHz by the mixer 406 creating the up-converted swept signal 434. The up-converted swept signal 434 leaves a RF port and enters a band pass filter 416, which passes signals between 405 and 430 MHz, and blocks undesired mixing products, such as an image. The delay of the band pass filter 416 is known beforehand, and the band pass filter's delay is relatively uniform over its pass band. A sample of the local oscillator's (410) signal is coupled through the coupled port of the directional coupler 412 into a coupled port of a combiner 418 and then into a high-side port of a diplex filter 420. A combiner 422 combines the up-converted swept signal 434 with the balance of the other downstream signals being transported over the cable network. The downstream spectrum is ideally vacant between 400 and 430 MHz except for the 400 MHz fixed CW signal 436 and the 405-430 MHz up-converted swept signal 434. A CPD-producing cable plant 424 has a source of CPD. At a CPD diode junction, the up-converted swept signal 434 is mixed with the local oscillator's (410) fixed CW signal 436, returning the up-converted swept signal 434 to the original 5-30 MHz frequency via a second order mixing action. The CPD-created upstream swept signal 432 travels upstream through a low port of the diplex filter 420 into a RF receive input port 426 of the network analyzer 402. A network analyzer, such as a HP8753C with an IFFT option, calculates an impulse response from the complex frequency response. The impulse response shows a round-trip time delay to and from the CPD-producing location.

The frequencies illustrated in this example illustrate second order mixing, producing a difference frequency signal. It is also possible to choose frequencies that produce a third or other order mixing. An additional CW signal can be inserted to cause third order mixing. Note that when there is large delay time, the sweep rate of the network analyzer must be slowed down to compensate for signal delay.

Also observe that if a larger test bandwidth is available, the distance to the CPD source can be ranged more accurately. Ranging time accuracy is proportional to the inverse of the swept bandwidth. If there are other desired or undesired signal sources in the 5-30 MHz band they will cause interference with the upstream swept signal 432, but the network analyzer can be adjusted to minimize the interference. Averaging on the network analyzer can be used to minimize the interference.

DESCRIPTION FIG. 5

The essential idea of the block diagram 400 of FIG. 4 can also be implemented in an alternate embodiment. In this alternate embodiment, a network analyzer 502 transmits 405-430 MHz and a local oscillator 512 is used for an up-conversion on the receive leg instead of the transmit leg.

Figure 5:
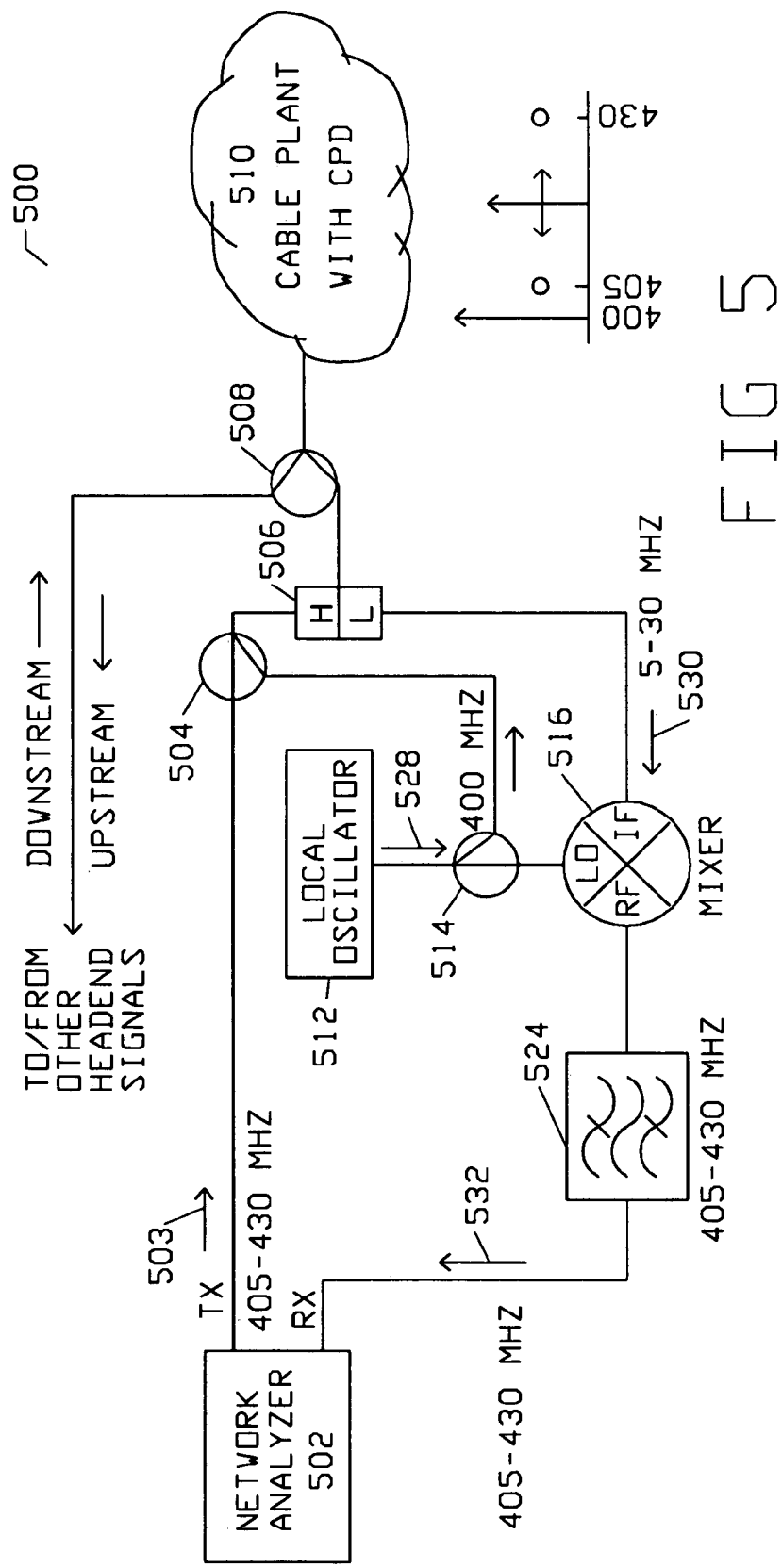
FIG. 5 is an alternate embodiment of the block diagram of FIG. 4

FIG. 5 is a block diagram 500 showing the network analyzer 502 which may, for example, be sweeping 405-430 MHz. A swept signal 503 of the network analyzer 502 may be applied to a first input of a combiner 504. The local oscillator 512, which may be running at 400 MHz as an example, delivers a fixed CW signal 528 to an input of a directional coupler 514. A coupled output of the directional coupler 514 delivers the fixed CW signal 528 to a second input of the combiner 504. The output of the combiner 504, which now has both the swept signal 503 and a fixed CW signal 528 is applied to a high side of a diplex filter 506. A common port of the diplex filter 506 is applied to a first input of a combiner 508, which sums the swept signal 503 and fixed CW signal 528 with the other downstream cable signals. The downstream signal passes through an output of the combiner 508 into a CPD-producing cable plant 510. In the CPD-producing cable plant 510 a source of CPD mixes the swept signal 503 with the local oscillator's (512) fixed CW signal 528 to produce an upstream swept signal 530. The upstream swept signal 530 travels upstream into the diplex filter 506 and out of the diplex filter's (506) low port into an IF port of a mixer 516, where it is up-converted to 405-430 MHz by a mixing action with the local oscillator's (512) fixed CW signal 528 which has been applied to a LO port. The 405-430 MHz signal passes out of a RF port into a band pass filter 524. In the band pass filter 524, the CPD-created test signal is filtered to eliminate undesired mixing products and LO bleed-through. A 405-430 MHz up-converted signal 532 is connected from the output of the band pass filter 524 to a RF receive input of the network analyzer 502. Except for the frequency conversion that is taking place on the upstream signal path, the operation of the network analyzer, including the IFFT, is similar to the operation described in FIG. 4.

As mentioned above, because a cable network typically has a tree and branch construction, there may be multiple possible locations on the network that correspond to the calculated CPD distance. However, it is exceedingly unlikely that CPD will be created in the middle of a piece of cable. Therefore, the distances associated with connectors, actives, and passives will be considered primary suspect locations.

DESCRIPTION FIG. 6

If two CW carriers are inserted on a downstream cable plant, and they are mixed by second order mixing at a source of CPD, a resulting upstream CW signal will be created and propagate upstream. Delay can be determined from frequency response as a change in phase with respect to the change frequency. That is:

$$\text{delay} = \frac{d\phi}{d\omega} \cong \frac{\Delta\phi}{\Delta\omega} \qquad (1)$$

where phi is the phase in radians and omega is the frequency in radians per second. Thus, one only needs to tune one of the two CW carriers and observe a phase change with respect to frequency to determine the distance to a source of CPD.

Figure 6:
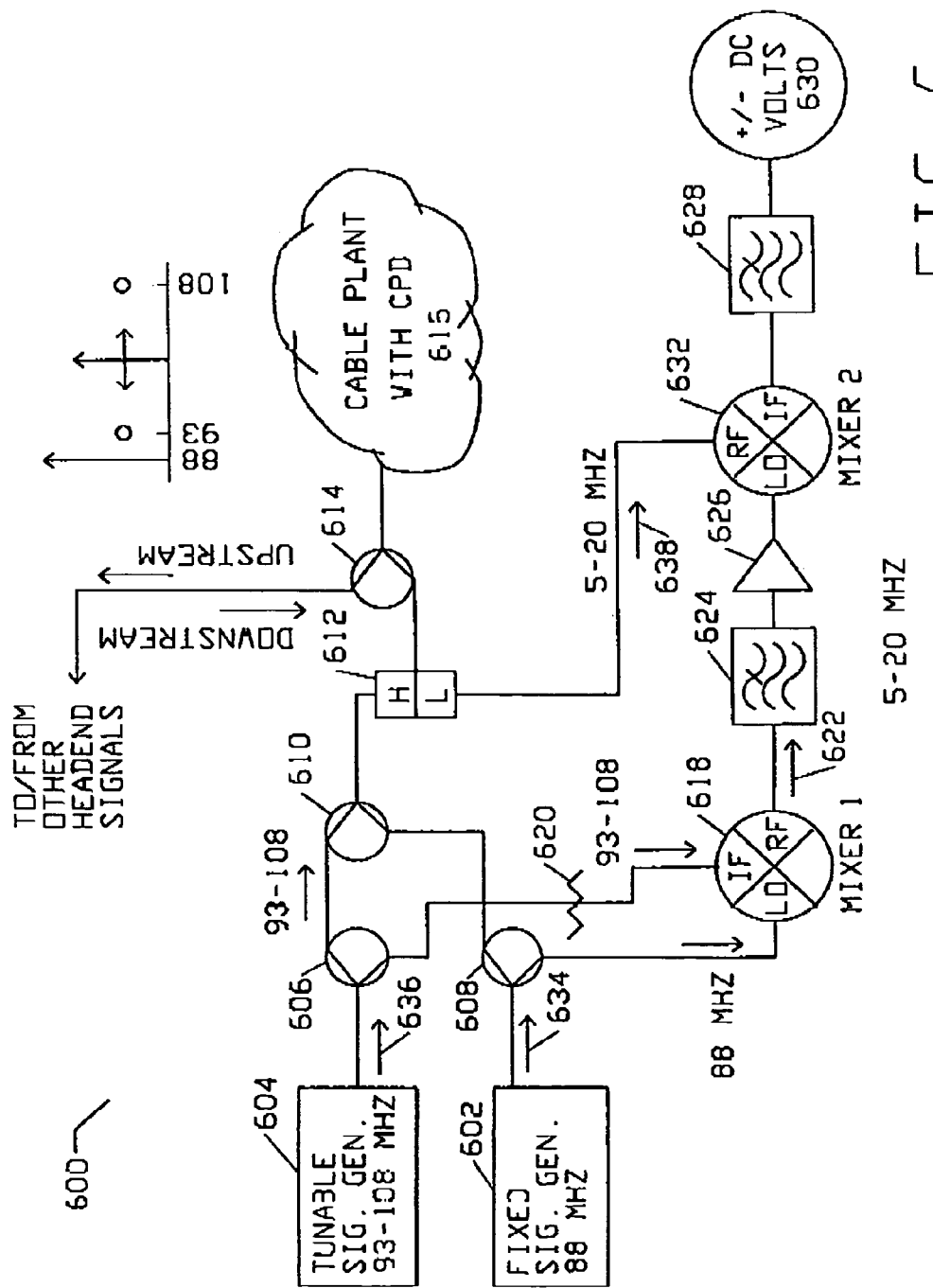
FIG. 6 is a test equipment block diagram of the present invention using a fixed and a tunable signal generator with an in-phase only demodulator.

FIG. 6 is a block diagram 600 of a method to range the distance to a source of CPD using a fixed signal generator 602 and a tunable signal generator 604. In a preferred embodiment the tunable signal generator has accurate frequency readout or an accompanying frequency counter. In this example, test signals are injected into the FW radio band, which is 88-108 MHz in the United States. The fixed signal generator 602 operates at 88 MHz and produces a fixed a CW signal 634. The tunable signal generator 604 is manually tuned between 93 and 108 MHz and produces a tunable CW signal 636. The output from the tunable signal generator 604 is connected to an input of a splitter 606. One output of the splitter 606 is connected to an input of a combiner 610. A fixed CW signal 634 of the fixed signal generator 602 is connected to an input of a splitter 608. An output of the splitter 608 is connected to another input of the combiner 610. An output of the combiner 610 now contains two CW signals, the fixed CW signal 634 and the tunable CW signal 636. The output of the combiner 610 is connected to a high port of a diplex filter 612. A common port of the diplex filter 612 is connected to an input port of a combiner 614. The other input port of the combiner 614 is connected to a cable plant with CPD 616. The CW carriers are mixed in the cable plant by a source of CPD to create an upstream CW signal 638, which travels upstream through the combiner 614 to the common port of the diplex filter 612. From the common port of diplex filter 612 the upstream CW signal passes through the diplex filter's (612) low port to the RF port of a second mixer 632.

The purpose of a first mixer 618 is to produce a mixing CW signal 622, which varies between 5 and 20 MHz. The frequency of the mixing CW signal 622 is the frequency difference between the tunable CW signal 636 and the fixed CW signal 634. A LO port of the first mixer 618 is connected to an output of the splitter 608 and an IF port of the first mixer 618 is connected to the splitter 606 through an attenuator 620. The attenuator 620 reduces the signal from the tunable signal generator 604 to approximately −10 dBm. The optimal LO level of the first mixer 618 and the second mixer 632 is assumed to be about +7 dBm. The mixing CW signal 622 passes through a low pass filter 624, which removes undesired mixing products and LO bleed-through. The output of the low pass filter 624 is connected to an amplifier 626 which boosts the LO drive level to the second mixer 632 to about +7 dBmv. The IF output of the second mixer 632 connects to a low pass filter 628, which may have a low corner frequency such as 10 kHz. The output of the low pass filter 628 is connected to a DC voltage display unit 630. The low pass filter passes the DC voltage while eliminating most noise.

Assuming that CPD is present, the output of the second mixer 632 will be a voltage that is a steady DC level while the tunable signal generator 604 is not being tuned, and will produce a sine wave voltage, centered about zero volts while the tunable signal generator 604 is being tuned. The output voltage can be displayed on a DC voltmeter, which deflects positive and negative relative to zero volts. Likewise, the voltage can be displayed on an oscilloscope, bar-graph or any other voltage indicating instrument.

The round-trip delay time associated with the round-trip distance to a source of CPD is determined by tuning the tunable signal generator 604 to find the frequency difference between positive-going voltage nulls, or two adjacent voltage peaks, on the DC voltage display unit 630. The reciprocal of the frequency is the unknown delay. For example, if the frequency difference between nulls is 100 kHz, the round-trip delay is 10 microseconds. For increased frequency accuracy, an operator may increase the number of positive-going voltage nulls and divide the frequency by the number of nulls used.

This method has an advantage of being conceptually simple and easy to operate, but if there are multiple large sources of CPD, the voltage deflection will not be a simple sinusoid, but move through a complicated periodic pattern, making distance ranging difficult

DESCRIPTION FIG. 7

Figure 7:
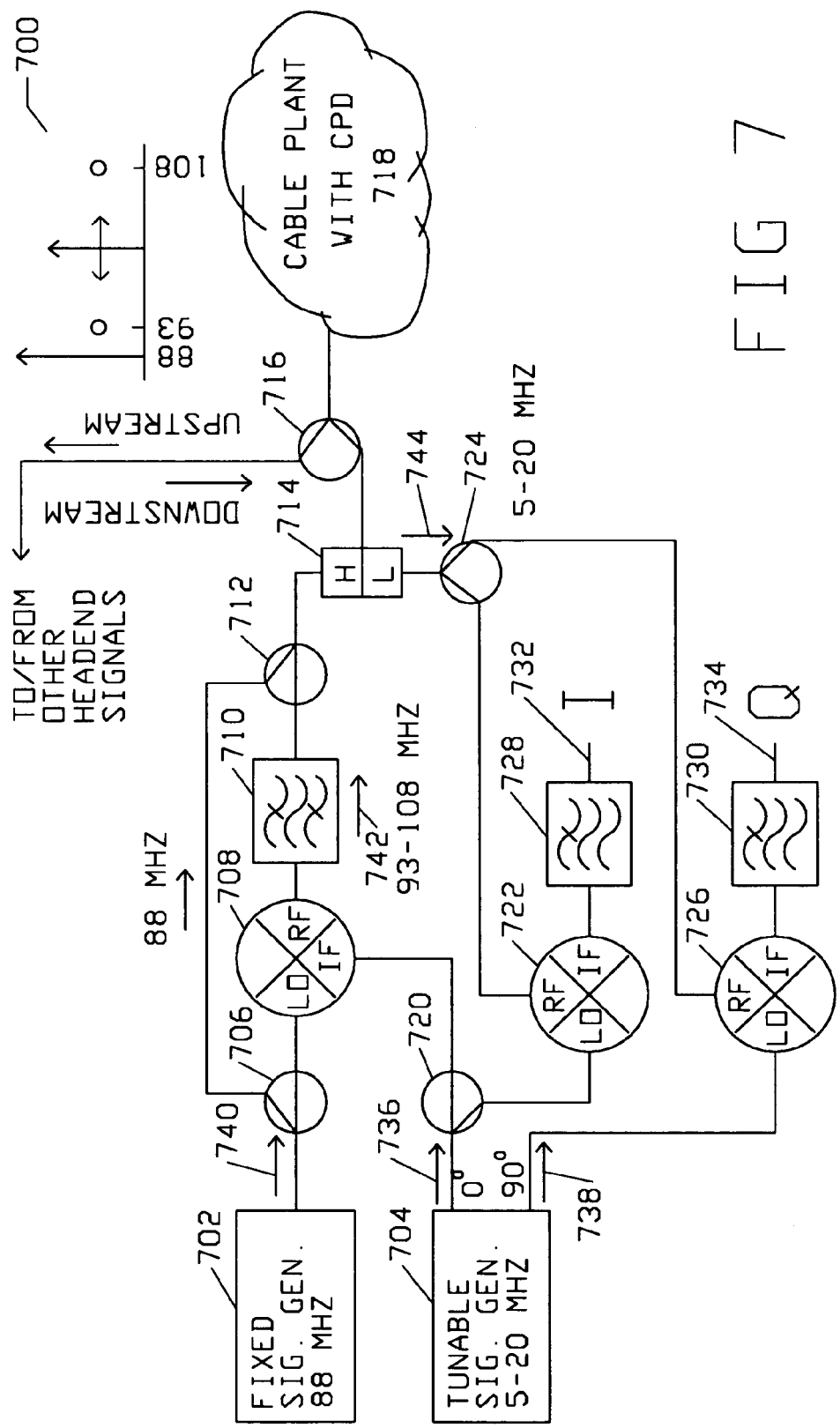
FIG. 7 is a test equipment block diagram of the present invention using a fixed and a tunable signal generator with a complex demodulator.

FIG. 7 is a block diagram 700 of an improved method to locate multiple sources of CPD. A fixed signal generator 702, running at 88 MHz, supplies a fixed CW signal 740 to a directional coupler 706. The output of the directional coupler 706 is connected to a LO port of an up-converting mixer 708. The RF port of the up-converting mixer 708 is connected to a band pass filter 710. The band pass filter 710 passes signals between 93 and 108 MHz with a flat frequency response and a uniform delay. The output of the band pass filter 710 is connected to one leg of a combiner 712. The other leg of the combiner 712 is connected to a coupled leg of the coupler 706. The output of the combiner 712, which contains a fixed CW signal at 88 MHz and an up-converted tunable signal 742 between 93 and 108 MHz, is connected to a high port of a diplex filter 714. A common port of the diplex filter 714 is connected to an input of a combiner 716. The other input of the combiner 716 is connected to the sink and source of other headend signals. The output of the combiner 716 is connected to a cable plant with CPD 718. Using second order mixing, the source of CPD mixes the fixed CW signal 740 and the up-converted tunable signal 742 and returns a mixed upstream signal 744 in the return band between 5 and 20 MHz. The mixed upstream signal 744 passes through the combiner 716 and the common port of the diplex filter 714 to the low port of the diplex filter 714. The low port of the diplex filter 714 is connected to a splitter 724.

A tunable signal generator 704 produces a tunable sine wave signal 736, on a port labeled 0 deg, and a tunable cosine wave signal 738, on a port labeled 90 deg. Numerically controlled oscillators (NCOs) are one possible way to produce tunable CW outputs with both sine and cosine waves. Hilbert transformers are another way. A directional coupler 720 splits the tunable sine wave signal 736. One leg of the directional coupler 720 is connected to an IF port of the up-converting mixer 708. The other leg of the directional coupler 720 is connected to a LO port of an in-phase mixer 722. The RF port of the in-phase mixer 722 is connected to one output of the splitter 724. The other output of the splitter 724 is connected to the RF port of a quadrature mixer 726. The tunable cosine wave signal 738, is connected to a LO port of the quadrature mixer 726. An in-phase low pass filter 728 is connected between the IF output of the in-phase mixer 722 and an I (in-phase) output line 732. An IF output of the quadrature mixer 726 is connected to an input of a quadrature low pass filter 730. The output of the quadrature low pass filter 730 is connected to a Q (quadrature) output line 734. The low pass filters 728 and 730 may have a low bandwidth for good noise rejection, provided that the frequency of the tunable signal generator 704 is changed slowly. For example, the bandwidth could be between 1 kHz and 10 kHz.

The I and Q output lines can be used in several ways. In an oscilloscope is put into an X-Y mode and the I output line 732 is connected to the X-channel and the Q output line 734 is connected to the Y-channel, and there is one source of CPD present, as the frequency of the tunable signal generator 704 is changed, the trace on the oscilloscope will trace out a circle. This is an example of a Lissajous pattern. A reciprocal of the frequency change required to make a complete circle is the round-trip delay associated with the CPD source.

Alternately, if the frequency of the tunable signal generator 704 is changed in small and uniform steps, and the I output line 732 voltages and the Q output line 734 voltages are recorded by an analog-to-digital converter at each step, the complex frequency response associated with the source of CPD is obtained. The complex frequency response can be supplied to an IFFT process that will return the impulse response. The impulse response will show the time delay associated with each of multiple CPD sources. A personal computer (PC) can control a programmable voltmeter that measures the I and Q voltages and change the frequency of the tunable signal generator 704. Equipment control is commonly done using GPIB. Another approach is to use an embedded microprocessor in place of the PC. Essentially, you have assembled a poor-man's network analyzer with the equipment in diagram FIG. 7.

A simplification is to remove the quadrature channel components: the quadrature mixer 726, the quadrature low pass filter 730, the splitter 724, and the cosine port on the tunable signal generator 704. This can be done by switching the tunable sine wave output 736 of the tunable signal generator 704 between a sine and cosine wave, and taking two voltage measurements on the I output line 732 for each frequency step. A NCO, such as the Analog Devices AD9850BRS has an ability to accurately change phase by 90 degrees on command.

Another Sweep System

Another sweep system that can be used in place of the network analyzer is the Cable Scope® system sold by Holtzman Inc. This device uses a burst test signal to produce the complex frequency response and impulse response. The round-trip time delay to a CPD source can be measured on the impulse response. In particular, the Cable Scope can be used in a local test configuration with the HE2M reference signal transmitter replacing the RF transmit output port 404 on the network analyzer 402 and a TDS-1002 digital oscilloscope replacing the RF receive input port 426 on the network analyzer 402.

Summary Ramifications and Scope

Although the description above contains many specificities, these should not be construed as limiting the scope of the invention, but as merely providing illustrations of some of the presently preferred embodiments of the invention. For example, 1. One may use another circuit to produce second order mixing in the local CPD source 338. For example, field effect transistors (FETs) have a square-law characteristic that can be exploited to produce good second order mixing.

2. The downstream digital carrier(s) that are selected to be test signals may be multiple 6 MHz wide carriers. For example, if second order mixing is used, a carrier can mix with another carrier that is 12 MHz away and create noise in the return band at 12 MHz. In general, as the number of carriers is increased, the background noise in the correlation plot decreases and the correlation peak increases.

3. If a cable system, such as a private or hospital system, has not yet deployed digital carriers, one or more digital carriers can be inserted for CPD location.

4. A band-limited random noise source may also be inserted and used as a test signal for CPD location.

5. The system of the present invention may be used for other applications such as satellite, microwave, or telephony.

6. Averaging may be used to increase the accuracy of all measurements. Averaging is particularly useful in the presence of additive return noise.

What I claim is:

1. An apparatus for locating an actual source of CPD in a two-way cable system having downstream and upstream frequency bands, the cable system containing a downstream signal which propagates in the downstream frequency band, and the downstream signal containing a plurality of TV channel carriers, said apparatus comprising:

a local CPD source including an input for receiving a sample of the downstream signal from a point in the cable system, said local CPD source further including a distortion generator configured to generate a local distortion signal from the sample of the downstream signal, the actual source of GPO mixing the TV channel carriers of the downstream signal to create an upstream actual distortion signal which propagates in the upstream frequency band of the cable system;

a cross-correlator adapted to perform a cross-correlation between the local distortion signal and the upstream actual distortion signal, said cross-correlator being coupled to said local CPD source to receive the local distortion signal and having an input for receiving the upstream actual distortion signal; and means for determining a time delay between the local distortion signal and the upstream actual distortion signal from the cross-correlation of said cross-correlator, wherein a round-trip time between the point and the actual source of CPD is determined from the time-delay.

2. The apparatus of claim 1, wherein the sample of the downstream signal includes a plurality of TV channel carriers, said distortion generator including a non-linear element that mixes the plurality of TV channel carriers to generate the local distortion signal.

3. The apparatus of claim 2, further comprising a filter coupled to said distortion generator, and wherein the local distortion signal contains a plurality of mixed product signals having frequencies in the upstream and the downstream frequency bands, said filter being configured to substantially remove the mixed product signals that have frequencies in the downstream frequency band.

4. The apparatus of claim 3, wherein the upstream frequency band is defined from about 5 MHz to about 42 MHz, and wherein said filter substantially removes signals having frequencies above about 42 MHz.

5. The apparatus of claim 3, wherein the cross-correlation of said cross-correlator is performed over substantially the entire upstream frequency band.

6. The apparatus of claim 2, wherein said distortion generator further includes an inductor connected in parallel with said non-linear element to hold the non-linear element at about 0 volts at DC.

7. The apparatus of claim 6, wherein said distortion generator further includes a resistor connected in parallel with said non-linear element to provide an improved impedance match to said non-linear element.

8. The apparatus of claim 2, wherein said non-linear element is a diode.

9. The apparatus of claim 8, wherein the diode is connected to ground and has a cathode and an anode, the diode having a polarity defined by whether the cathode or the anode is connected to ground, the polarity of the diode being reversible to correspond to a polarity of the actual source of CPD.

10. The apparatus of claim 2, wherein said distortion generator further includes a by-pass capacitor coupled between the input of said local CPD source and said non-linear element.

11. The apparatus of claim 2, wherein said distortion generator further includes a resistor connected in parallel with said non-linear element to provide an improved impedance match to said non-linear element.

12. The apparatus of claim 2, wherein said non-linear element is a field effect transistor.

13. The apparatus of claim 1, wherein said local CPD source includes a filter, coupled to the input of said local CPD source, for filtering the sample of the downstream signal to produce a filtered sample of the downstream signal, said distortion generator generating the local distortion signal from the filtered sample of the downstream signal.

14. The apparatus of claim 13, wherein the downstream signal includes a plurality of analog and digital TV channel carriers, and wherein the filter is configured to substantially remove the analog TV channel carriers from the sample of the downstream signal, such that the filtered sample of the downstream signal is substantially free of the analog TV channel carriers.

15. The apparatus of claim 13, wherein said local CPD source further includes an amplifier, coupled to the filter, for amplifying the filtered sample of the downstream signal to produce an amplified, filtered sample of the downstream signal, said distortion generator generating the local distortion signal from the amplified, filtered sample of the downstream signal.

16. The apparatus of claim 1, further comprising means for locating the actual source of CPD from at least the round-trip time.

17. The apparatus of claim 16, wherein said means for locating the actual source of CPD includes
means for determining the distance to the actual source of CPD from at least the round-trip time, and
a map specifying a plurality of distances in the cable system, whereby the distance to the actual source of CPD is compared to the plurality of distances specified on said map to locate the actual source of CPD.

18. The apparatus of claim 1, wherein said local CPD source includes a tilt network coupled to the input of said local CPD source, the tilt network being configured to effect a tilt on the sample of the downstream signal and produce a tilted sample of the downstream signal, said distortion generator generating the local distortion signal from the tilted sample of the downstream signal.

19. The apparatus of claim 1, wherein the tilt network is adjustable such that the tilt on the sample of the downstream signal is adjustable to optimize the cross-correlation.

20. The apparatus of claim 1, wherein said local CPD source includes an amplifier, coupled to the input of said local CPD source, for amplifying the sample of the downstream signal to produce an amplified sample of the downstream signal, said distortion generator generating the local distortion signal from the amplified sample of the downstream signal.

21. The apparatus of claim 20, wherein the amplifier is adjustable such that the amplification of the sample of the downstream signal is adjustable to optimize the cross- correlation.

22. The apparatus of claim 1, further comprising a probe, and wherein the cable system includes a network device having a port that allows access to the downstream signal and the upstream actual distortion signal, said probe including an input configured to be coupled to the port of the network device for obtaining a sample of the downstream signal and a sample of the upstream actual distortion signal, said probe further including first and second outputs and means for separating the sample of the downstream signal from the sample of the upstream actual distortion signal and for presenting the samples to the first and the second outputs, respectively, the input of said local CPD source being coupled to the first output of said probe to receive the sample of the downstream signal, and said cross-correlator being coupled to the second output of said probe to receive the sample of the upstream actual distortion signal.

23. The apparatus of claim 22, wherein the port of the network device is a seizure screw port, and wherein the input of said probe is configured to be connected to the seizure screw port such that said probe is in electrical communication with the cable system.

24. The apparatus of claim 1, further comprising means for determining the distance between the point and the actual source of CPD from at least the round-trip time.

25. The apparatus of claim 1, wherein said cross-correlator includes a processor configured to perform the cross-correlation in the time domain.

26. The apparatus of claim 1, wherein said cross-correlator includes a processor configured to perform the cross-correlation in the frequency domain by a multiplication operation.

27. The apparatus of claim 1, further comprising means for generating a cross-correlation plot from the cross-correlation of said cross-correlator.

28. The apparatus of claim 1, wherein said cross-correlator is adapted to perform a series of cross-correlations between the local distortion signal and the upstream actual distortion signal and produce an average result of the series of cross-correlations, whereby the time delay is determined from the average result.

29. A system for locating an actual source of CPD on a two-way cable system carrying a downstream signal, comprising:
   a local CPD source generating a local distortion signal from a sample of the downstream signal, the downstream signal including multiple carriers of TV channels, the actual source of CPD mixing the carriers of the TV channels to create an upstream actual distortion signal; and
   a cross-correlator for performing a cross-correlation between the local distortion signal and the upstream actual distortion signal to create a cross-correlation result;
   wherein a round-trip time to and from the actual source of CPD is determined from the cross-correlation result and the location of the actual source of CPD is determined from at least the round-trip time.

30. A system according to claim 29, further comprising means for determining the round-trip time to and from the actual source of CPD from the cross-correlation result.

31. A system according to claim 30, further comprising means for locating the actual source of CPD from at least the round-trip time.

32. A system according to claim 31, wherein said means for locating the actual source of CPD includes:
   distance means for determining the distance to the actual source of CPD from at least the round-trip time, and
   a map specifying a plurality of distances in the cable system, whereby the distance to the actual source of CPD is compared to the plurality of distances specified on said map to locate the actual source of CPD.

33. A system according to claim 29, wherein the sample of the downstream signal includes multiple carriers of TV channels, said local CPD source including a non-linear element that mixes the multiple carriers of TV channels of the sample to generate the local distortion signal.

34. A system according to claim 33, wherein said local CPD source further includes a resistor connected in parallel with said non-linear element to provide an improved impedance match to said non-linear element.

35. A system according to claim 33, wherein said non-linear element is a field effect transistor.

36. A system according to claim 29, further comprising a filter for filtering the sample of the downstream signal to produce a filtered sample of the downstream signal, said local CPD source generating the local distortion signal from the filtered sample of the downstream signal.

37. A system according to claim 36, wherein the downstream signal includes a plurality of analog and digital TV channel signals, and wherein said filter substantially removes the analog TV channel signals from the sample of the downstream signal, such that the filtered sample of the downstream signal is substantially free of analog TV channel signals.

38. A system according to claim 29, further comprising means for generating a cross-correlation plot from the cross-correlation result.

39. A system according to claim 38, wherein said non-linear element is a diode.

40. A system according to claim 1 wherein the local CPD source uses second order mixing.

41. A system according to claim 1 wherein the local CPD sources uses third order mixing.

42. A system according to claim 1 wherein the local CPD sources uses a diode for mixing.

43. A system according to claim 1 wherein a probe obtains the actual distortion signal and the downstream signal.

44. A system according to claim 1 wherein the TV channels are digital TV channels.

45. A system according to claim 29, wherein said cross-correlator includes a processor configured to perform the cross-correlation in the time domain.

46. A system according to claim 29, wherein said cross-correlator includes a processor configured to perform the cross-correlation in the frequency domain by a multiplication operation.

47. A system according to claim 29, wherein said cross-correlator is adapted to perform a series of cross-correlations between the local distortion signal and the upstream actual distortion signal and produce a series of cross-correlation results, respectively, said cross- correlator being further adapted to average the series of cross-correlation results and produce an average cross-correlation result, whereby the round-trip time to and from the actual source of CPD is determined from the average cross-correlation result.

48. A method of locating an actual source of CPD on a two-way cable system carrying a downstream signal, said method comprising the steps of:
   (a) receiving a sample of the downstream signal from the two-way cable system, the downstream signal including a plurality of TV channel carriers;
   (b) generating a local distortion signal from the sample of the downstream signal, the actual source of CPD mixing the plurality of TV channel carriers of the downstream signal to create an upstream actual distortion signal;
   (c) receiving the upstream actual distortion signal from the two-way cable system;
   (d) performing a cross-correlation of the local distortion signal and the upstream actual distortion signal to create a cross-correlation result;
   (e) determining a round-trip time to and from the actual source of CPD from the cross-correlation result; and
   (f) locating the actual source of CPD based at least on the round-trip time.

49. The method of claim 48, further comprising the step of filtering the sample of the downstream signal prior to said step (b).

50. The method of claim 48, wherein the downstream signal includes a plurality of analog and digital TV channel signals, and wherein said step of filtering the sample of the downstream signal includes, substantially removing the analog TV channel signals from the sample of the downstream signal.

51. The method of claim 48, wherein the sample of the downstream signal includes a plurality of TV channel carriers, and wherein said step (b) includes mixing the plurality of TV channel carriers to generate the local distortion signal.

52. The method of claim 51, further comprising the step of filtering the local distortion signal to substantially remove the frequencies in the downstream frequency band.

53. The method of claim 48, wherein said step (f) includes locating the actual source of CPD using at least the round-trip time and a map of the cable system.

54. The method of claim 48, further comprising the step of generating a cross-correlation plot from the cross-correlation result.

55. The method of claim 48, wherein said step (d) includes cross-correlating the local distortion signal and the upstream actual distortion signal in the time domain.

56. The method of claim 48, wherein said step (d) includes performing the cross-correlation in the frequency domain by a multiplication operation.

57. The method of claim 48, further comprising the steps of:
(g) repeating step (d) to create at least one other cross-correlation result; and
(h) determining an average of the cross-correlation result of said step (d) and the least one other cross-correlation result of said step (g) to create an average cross-correlation result, whereby the round-trip time to and from the actual source of CPD is determined from the average cross-correlation result.

58. The method of claim 48, further comprising the steps of:
effecting a tilt on the sample of the downstream signal prior to said step (b); and adjusting the tilt on the sample of the downstream signal to optimize the cross-correlation result.

59. The method of claim 48, further comprising the steps of:
amplifying the sample of the downstream signal prior to said step (b); and
adjusting the amplification of the sample of the downstream signal to optimize the cross-correlation result.

60. The method of claim 48, wherein the two-way cable system has downstream and upstream frequency bands, the upstream actual distortion signal having frequencies only in the upstream frequency band, and the local distortion signal having frequencies in the upstream and the downstream frequency bands.

61. An apparatus for locating an actual source of CPD in a two-way cable system having downstream and upstream frequency bands, the cable system containing a downstream signal which propagates in the downstream frequency band, and the downstream signal containing a plurality of digital TV channel signals, said apparatus comprising:
a local CPD source including
an input for receiving a sample of the downstream signal from a point in the cable system,
a first filter coupled to the input and adapted to pass substantially only the plurality of digital TV channel signals,
a non-linear element coupled to the first filter and adapted to mix the plurality of digital TV channel signals to create a plurality of mixed product signals, the plurality of mixed product signals having frequencies in both the upstream and the downstream frequency bands, and
a second filter coupled to the non-linear element and adapted to substantially remove the mixed product signals that have frequencies in the downstream frequency band to create a local distortion signal, the actual source of CPD mixing the plurality of digital TV channel signals of the downstream signal to create an upstream actual distortion signal that propagates in the upstream frequency band of the cable system;
a cross-correlator including
a first input, coupled to said local CPD source, for receiving the local distortion signal, and
a second input for receiving the upstream actual distortion signal from the cable system,
said cross-correlator being adapted to perform a cross-correlation between the local distortion signal and the upstream actual distortion signal; and
means for determining a time delay between the local distortion signal and the upstream actual distortion signal from the cross-correlation performed by said cross-correlator, wherein a round-trip time between the point and the actual source of CPD is determined from the time delay.

62. The apparatus of claim 61, further comprising means for locating the actual source of CPD from at least the round-trip time.

63. An apparatus for locating an actual source of CPD in a two-way cable system having downstream and upstream frequency bands, the cable system containing a downstream signal which propagates in the downstream frequency band, and the downstream signal containing a plurality of TV channel signals, said apparatus comprising:
a local CPD source including
an input for receiving a sample of the downstream signal from a point in the cable system,
a non-linear element coupled to the input and adapted to mix the plurality of TV channel signals to create a plurality of mixed product signals, the plurality of mixed product signals having frequencies in both the upstream and the downstream frequency bands, and
a filter coupled to the non-linear element and adapted to substantially remove the mixed product signals that have frequencies within the downstream frequency band to create a local distortion signal, the actual source of CPD mixing the plurality of TV channel signals of the downstream signal to create an upstream actual distortion signal that propagates in the upstream frequency band of the cable system;
a cross-correlator including
a first input, coupled to said local CPD source, for receiving the local distortion signal, and
a second input for receiving the upstream actual distortion signal from the cable system,
said cross-correlator being adapted to perform a cross-correlation between the local distortion signal and the upstream actual distortion signal; and
means for determining a time delay between the local distortion signal and the upstream actual distortion signal from the cross-correlation performed by said cross-correlator, wherein a round-trip time between the point and the actual source of CPD is determined from the time delay.

64. The apparatus of claim 63, further comprising means for locating the actual source of CPD from at least the round-trip time.

65. A method of locating an actual source of CPD on a two-way cable system carrying a downstream signal, said method comprising the steps of:

(a) receiving a sample of the downstream signal from the two-way cable system, the downstream signal including a plurality of TV channel carriers;
(b) generating a local distortion signal from the sample of the downstream signal, the actual source of CPD mixing the plurality of TV channel carriers of the downstream signal to create an upstream actual distortion signal;
(c) receiving the upstream actual distortion signal from the two-way cable system;
(d) performing a cross-correlation of the local distortion signal and the upstream actual distortion signal to create a cross-correlation result;
(e) repeating step (d) to create at least one other cross-correlation result;
(f) determining an average of the cross-correlation result of said step (d) and the least one other cross-correlation result of said step (e) to produce an average cross-correlation result; and
(g) determining a round-trip time to and from the actual source of CPD from the average cross-correlation result.

66. The method of claim 65, wherein the sample of the downstream signal includes a plurality of TV channel carriers, and wherein said step (b) is performed by using a diode to mix the plurality of TV channel carriers, the diode being connected to ground and having a cathode and an anode, the diode having a polarity defined by whether the cathode or the anode is connected to ground, the actual source of CPD having a particular polarity, said method further comprising the step of reversing the polarity of the diode to correspond to the particular polarity of the actual source of CPD.

67. A method of locating an actual source of CPD in a two-way cable system having downstream and upstream frequency bands, the cable system containing a downstream signal which propagates in the downstream frequency band, and the downstream signal containing a plurality of TV channel carriers, said method comprising the step of:
(a) receiving a sample of the downstream signal from a point in the cable system;
(b) generating a local distortion signal from the sample of the downstream signal, the actual source of CPD mixing the plurality of TV channel carriers of the downstream signal to create an upstream actual distortion signal which propagates in the upstream frequency band of the cable system;
(c) receiving the upstream actual distortion signal from the cable system;
(d) performing a cross-correlation of the local distortion signal and the upstream actual distortion signal;
(e) determining a time delay between the local distortion signal and the upstream actual distortion signal from step (d); and
(f) determining a round-trip time between the point and the actual source of CPD from the time-delay.

* * * * *

UNITED STATES PATENT AND TRADEMARK OFFICE
CERTIFICATE OF CORRECTION

PATENT NO. : 7,415,367 B2
APPLICATION NO. : 10/850528
DATED : August 19, 2008
INVENTOR(S) : Thomas Holtzman Williams It is certified that error appears in the above-identified patent and that said Letters Patent is hereby corrected as shown below:

Abstract -
Line 11, "correlation plot," should read --correlation plot.--; and insert the following text just before "and the distance" --The round-trip time to the source of CPD is determined from the cross-correlation plot,--

Column 1
Line 7, "is a continuation" should read --claims the benefit--.

Column 9
Line 49, "change frequency" should read --change in frequency--.

Column 10
Line 67, insert after "difficult" a period, --.--.

Column 13
Line 6, "GPO" should read --CPD--.

Column 14
Line 36, "claim 1" should read --claim 18--.

UNITED STATES PATENT AND TRADEMARK OFFICE
CERTIFICATE OF CORRECTION

PATENT NO. : 7,415,367 B2
APPLICATION NO. : 10/850528
DATED : August 19, 2008
INVENTOR(S) : Thomas Holtzman Williams It is certified that error appears in the above-identified patent and that said Letters Patent is hereby corrected as shown below:

Column 16
Line 14, "claim 1" should read --claim 29--.
Line 16, "claim 1" should read --claim 29--.
Line 18, "claim 1" should read --claim 29--.
Line 20, "claim 1" should read --claim 29--.
Line 22, "claim 1" should read --claim 29--.
Line 35, "cross- correlator" should read --cross-correlator--.
Line 62, "claim 48" should read --claim 49--.

Signed and Sealed this

Fourteenth Day of October, 2008

JON W. DUDAS
*Director of the United States Patent and Trademark Office*